Jan. 23, 1951        B. A. DICKSON        2,539,233
LIFT TRUCK AND ATTACHMENT THEREFOR
Filed May 3, 1948                                5 Sheets-Sheet 1
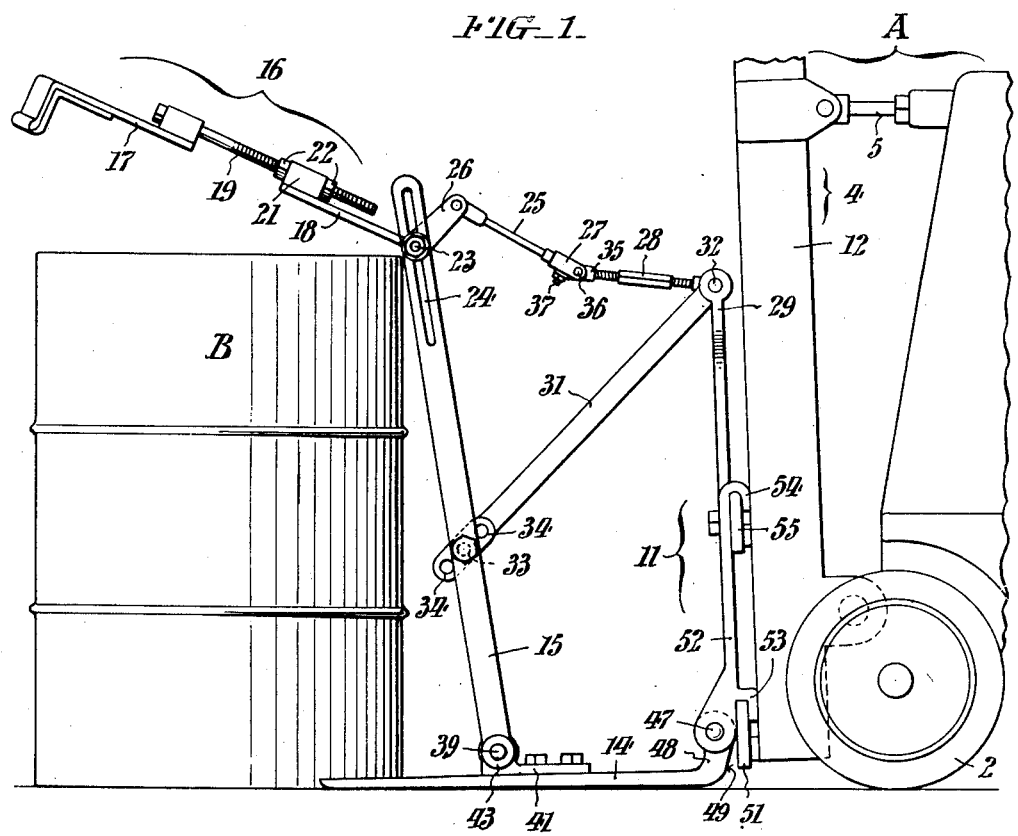
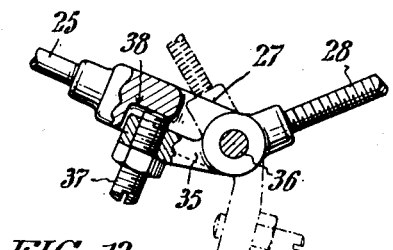
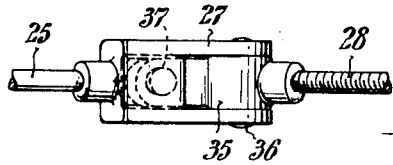
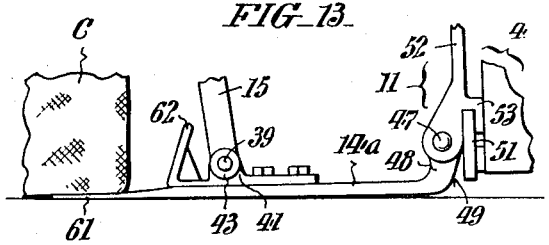
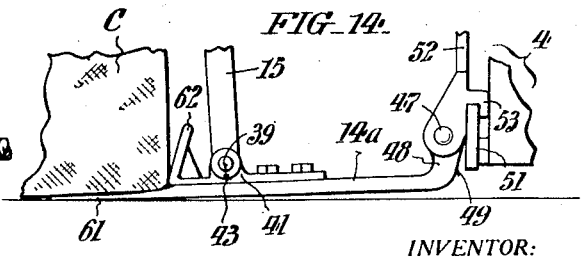
WITNESSES
INVENTOR:
Benjamin A. Dickson,
BY Paul & Paul
ATTORNEYS.

Jan. 23, 1951   B. A. DICKSON   2,539,233
LIFT TRUCK AND ATTACHMENT THEREFOR
Filed May 3, 1948   5 Sheets-Sheet 2
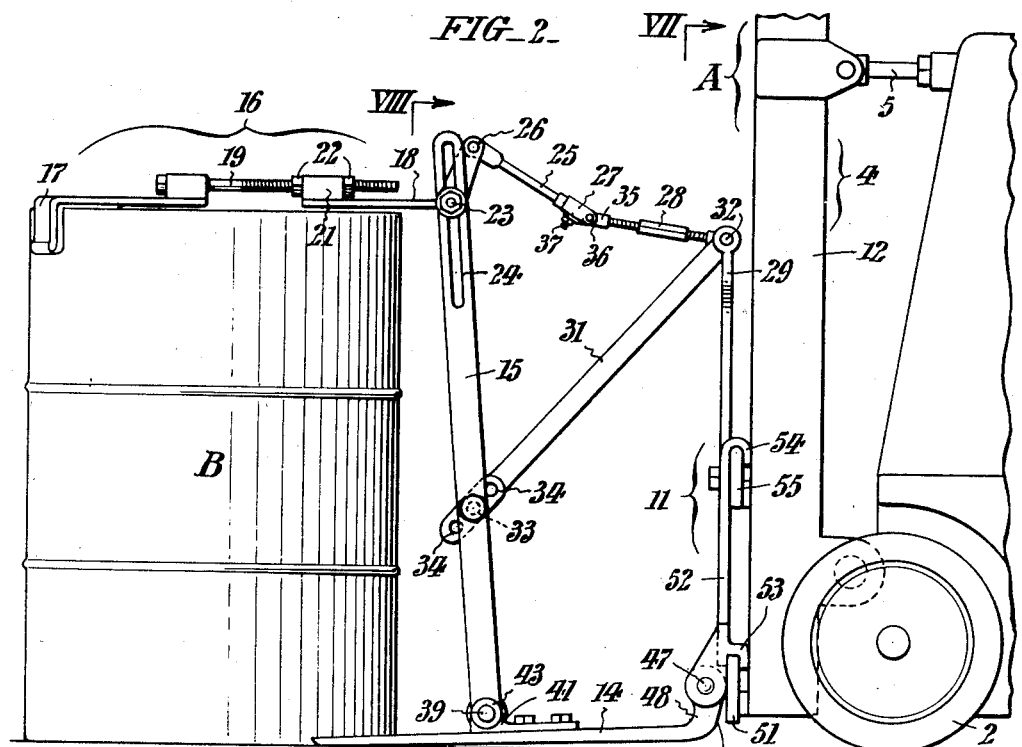
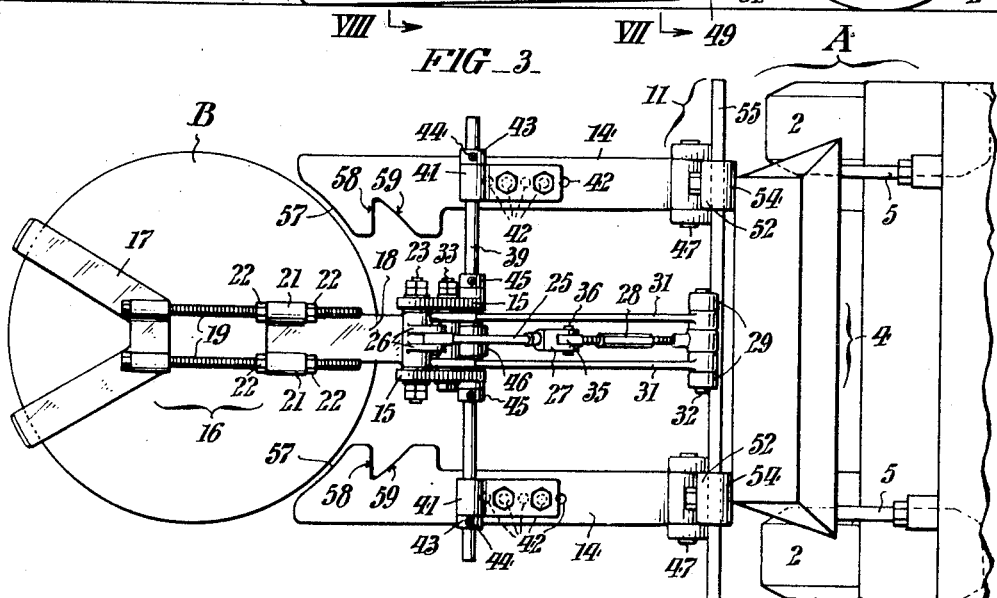
WITNESSES
Hubert Fuchs
Thomas W. Kerr Jr.
INVENTOR:
Benjamin A. Dickson,
BY Paul & Paul
ATTORNEYS.

Jan. 23, 1951  B. A. DICKSON  2,539,233
LIFT TRUCK AND ATTACHMENT THEREFOR
Filed May 3, 1948  5 Sheets-Sheet 3
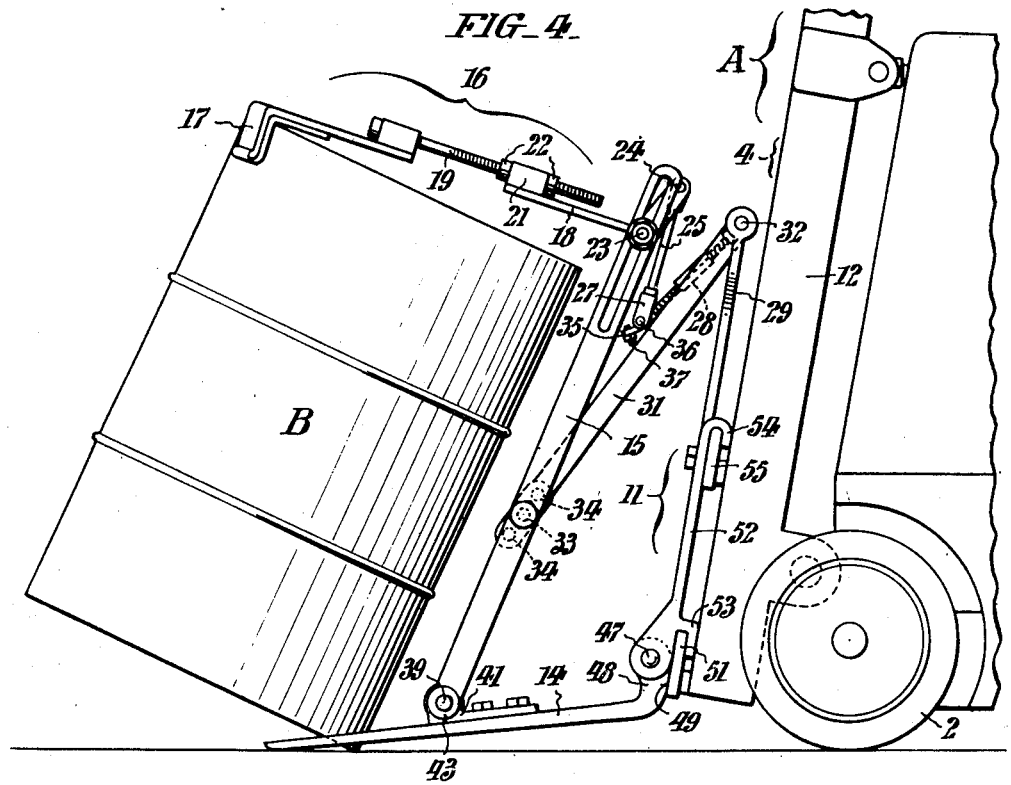
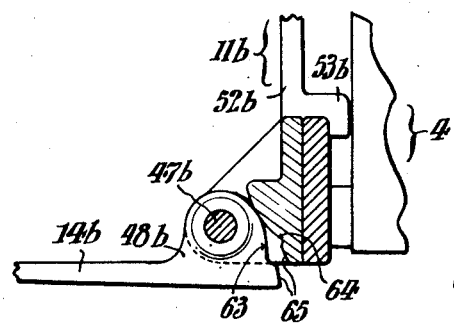
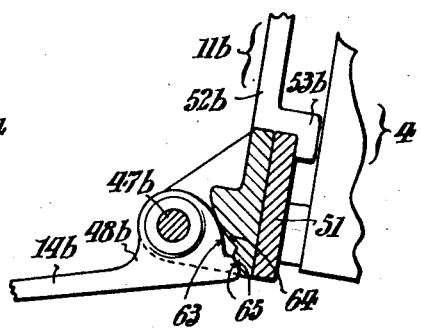
WITNESSES
Hubert Fuchs
Thomas W. Kerr Jr.
INVENTOR:
Benjamin A. Dickson,
BY Paul & Paul
ATTORNEYS.

Jan. 23, 1951  B. A. DICKSON  2,539,233
LIFT TRUCK AND ATTACHMENT THEREFOR
Filed May 3, 1948  5 Sheets-Sheet 4
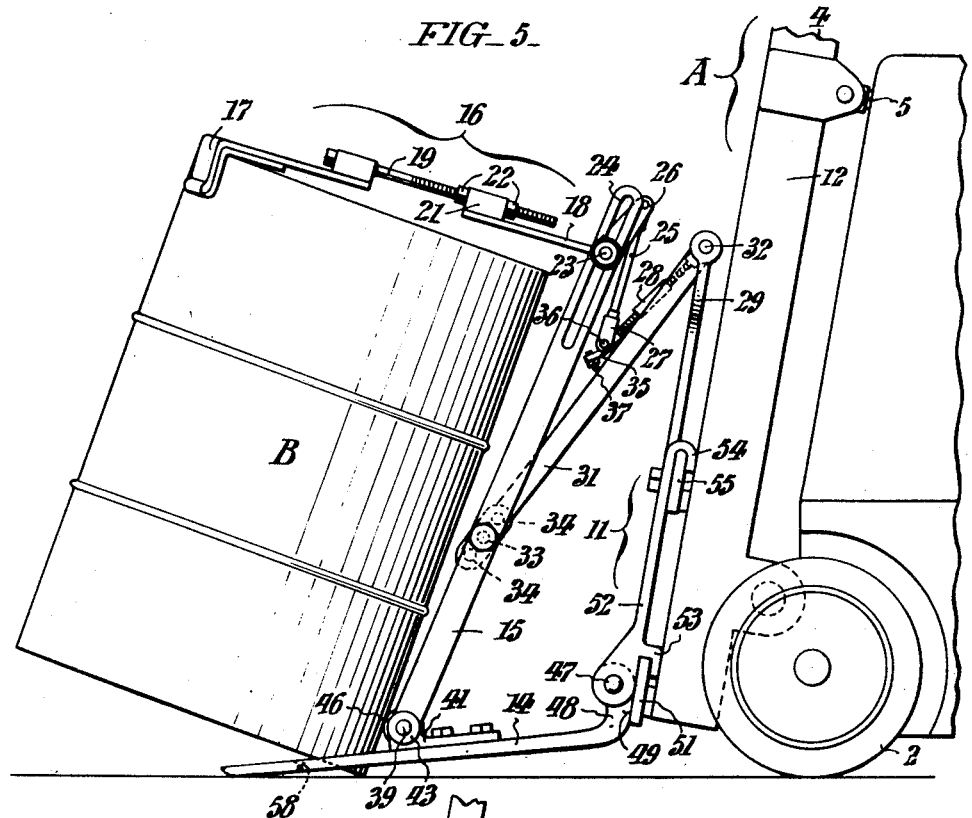
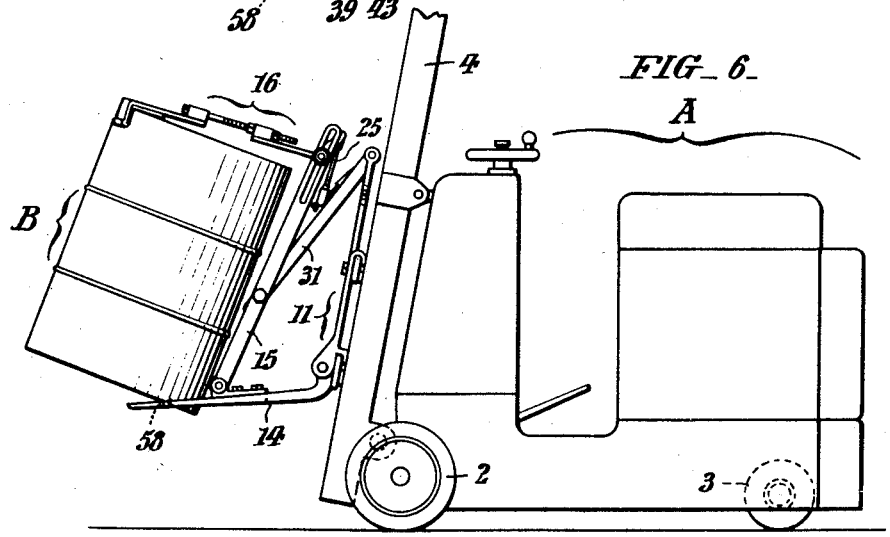
WITNESSES
Hubert Fuchs
Thomas W. Kerr, Jr.
INVENTOR:
Benjamin A. Dickson,
BY Paul & Paul
ATTORNEYS.

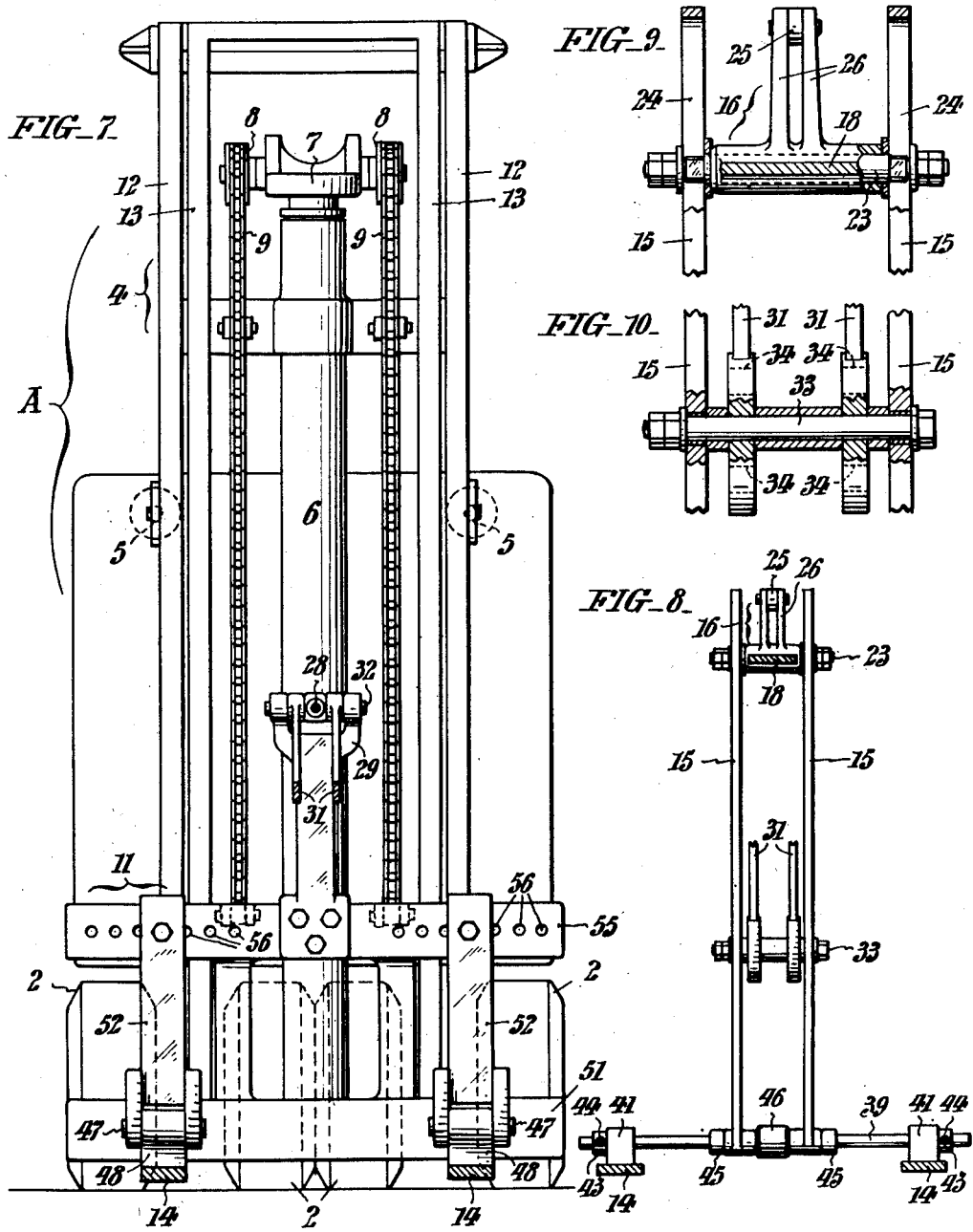

Patented Jan. 23, 1951

2,539,233

UNITED STATES PATENT OFFICE 2,539,233

LIFT TRUCK AND ATTACHMENT THEREFOR

Benjamin A. Dickson, Paoli, Pa., assignor to Terminal Warehouse Company, Philadelphia, Pa., a corporation of Pennsylvania Application May 3, 1948, Serial No. 24,706

16 Claims. (Cl. 214—66)

This invention relates to lift trucks and attachments therefor. Although capable of a wide variety of applications, it is especially useful as applied to a lift truck having a tiltable mast and a load carrying member movable vertically on the mast.

The principal object of the invention is to facilitate the operations involved in picking up and discharging a load. In the handling of large heavy objects, for example, drums, barrels, bales, rolls etc., by means of an ordinary fork truck it is often a difficult matter to load the object upon the forks or to unload it when transported to its destination. This is particularly true of large drums which are sometimes closely nested together, as in a freight car or warehouse, with the result that it is a laborious and time consuming operation to separate the objects from each other so that they may be loaded upon the truck.

A specific object of the invention is to provide a reliable and efficient attachment which can be readily applied to existing trucks now in common use and, when so applied, enables the operator to have access to and to pick up or discharge a load speedily and with avoidance of the difficulties heretofore encountered.

Another specific object of the invention is to provide an attachment of such character that when installed on a lift truck the ordinary controls available to the operator may be utilized to effect all of the various movements involved, such as the gripping of the load, causing it to be inclined at an angle to its normal upright position, while steadying the base, causing it to be picked up while so inclined and lifted to the desired elevation, transporting it, and finally lowering and discharging the load at its destination, and releasing the gripping device.

Other more specific objects and advantages, including those derived from simplicity and economy, as well as capacity for adjustment to accommodate loads varying as to size and character, will become more fully apparent from a description of an embodiment of the invention, together with certain modifications thereof, which follows hereinafter having reference to the accompanying drawings. Of the drawings:

Fig. 1 represents in side elevation a portion of the forward end of a conventional lift truck equipped with a load carrying attachment of this invention, showing the same in the position which it assumes when about to engage a drum, the mast of the truck being tilted forwardly;

Fig. 2 represents a similar side elevation of said apparatus, showing the position which the attachment assumes when it first grips the drum, the mast of the truck being then in a vertical position;

Fig. 3 represents a plan view of the same;

Fig. 4 represents a view similar to Figs. 1 and 2, showing the position which the attachment assumes when it inclines the drum preparatory to lifting it, the mast of the truck being rearwardly tilted;

Fig. 5 represents a view similar to Fig. 4, showing the result of a further advance of the truck towards the drum;

Fig. 6 represents on a smaller scale a more complete view of the truck, in side elevation, showing the attachment with the drum carried thereon and elevated upon the mast;

Fig. 7 represents a front view of the truck, taken as indicated by the arrows VII—VII of Fig. 2;

Fig. 8 represents a vertical cross section of the load carrying atttachment, taken as indicated by the arrows VIII—VIII of Fig. 2.

Fig. 9 represents an enlarged view of the pivotal connection between the load gripping device and the rocker arms upon which it is supported;

Fig. 10 represents an enlarged view of the pivotal connection between the rocker arms and the links for actuating the same;

Figs. 11 and 12 represent enlarged views of the knuckle joint in the linkage employed for swinging the gripping device, Fig. 11 showing in dot-and-dash lines the extreme angular positions of the two parts of the joint;

Figs. 13 and 14 represent a modified form of attachment having forks of a type which may be used to advantage when handling bales or the like, Fig. 13 showing the mast in forwardly tilted position and the bale as initially engaged; and Fig. 14 showing the mast in vertical position and the truck advanced to effect a more complete engagement; and Figs. 15 and 16 represent a modified form of pivotal connection which may be used between the forks and the carriage upon which they are supported, showing the parts in different angular positions.

With specific reference to Figs. 1 to 7 there is shown an example of the invention as applied to a well known type of lift truck, comprehensively designated at A. This truck is mounted upon sets of wheels 2, 3 of which the rear wheels 3 constitute steering wheels. In the example selected for illustration the mast 4 of the truck may be tilted forwardly to an angle of about two degrees from the vertical position and may be tilted rearwardly to an angle of about ten degrees from the vertical position, such tilting being effected by movement of power operated rods 5. To raise and lower the load carrying attachment a hydraulic cylinder 6, see Fig. 7, is employed. This cylinder 6 actuates a ram 7 having sprocket wheels 8 which serve to raise and lower chains 9 having their lower ends fixed to a carriage 11 movable up and down on the mast 4 and guided in such movement by columns 12 and 13. It may be assumed that the truck A is self propelled and that there is available to the operator suitable controls for advancing or reversing, for steering, for operating the ram 7 to raise and lower the carriage, and for tilting the mast forwardly or rearwardly, as desired. Such controls and other details of the truck are not herein described as they are well known in the art and form no part of this invention.

Upon the movable carriage 11 there is pivotally mounted a pair of forks 14 which project forwardly from the mast 4 and constitute the load carrying members. A pair of rocker arms 15 is pivotally connected to the forks 14 and serves to support a load gripping device 16 which spans the top of the drum B, or whatever object is to be transported, and grips or releases the far edge of the same according to whether it is swung downwardly or upwardly.

For the handling of drums or other cylindrical objects the gripping device 16 desirably embodies prongs 17 which hook over the top edge of the object and which are adjustably connected to a bell crank lever 18 by means of threaded bolts 19 passing through sleeves 21 in said parts and secured by nuts as shown most clearly in Fig. 8. In an obvious manner the effective length of the gripping device 16 may be varied by adjustment of the nuts 22 on the bolts 19 and thus the device may be adapted to accommodate loads of varying size.

As illustrated in Fig. 9, the bell crank lever 18 is fulcrumed on a pivot pin 23 the ends of which pass through and are slidable in slots 24 in the pair of rocker arms 15 and are held in place by nuts and washers. The fulcrum point of the bell crank lever 18 with respect to the rocker arms 15 may thus be varied so that the gripping device may accommodate drums or other objects of varying length.

To effect the desired movements of the gripping device 16 two separate linkages are employed. One linkage consists of a rod 25 pivotally connected at one end to the arm 26 of bell crank lever 18 and having at its other end a clevis 27 forming part of a knuckle joint and connecting with a turnbuckle 28. The other end of turnbuckle 28 is pivotally connected to a yoke 29 which is affixed to and projects upwardly from the carriage 11. This linkage serves to swing the gripping device 16 upwardly preparatory to its engagement with the load and incident to its release from the load, such upward swinging being accomplished by the forward tilting of the mast 4.

The second linkage consists of a pair of parallel links 31 which are pivotally connected to the pivot pin 32 of yoke 29 at their inner ends and are pivotally connected to the rocker arms 15, by means of pivot pin 33, at their outer ends. To render the links 31 adjustable and thus provide for loads of varying size, the outer end of each link has a number of holes 34 into any one of which the pivot pin 33 may be fitted. Details of this connection, including the washers, spacers and nuts by which the parts are joined are shown in Fig. 10. To vary the effective length of the links 31 simply involves removal and re-setting of the pivot pin 33 into the appropriate holes 34 at the ends of the links.

Details of the knuckle joint between rod 25 and turnbuckle 28 are clearly shown in Figs. 11 and 12. The end of turnbuckle 28 joins a fitting 35 which is connected to the clevis 27 of a rod 25 by a pin 36. This fitting 35 carries a set screw 37 which engages a shoulder 38 and limits the extreme angular separation between rod 25 and turnbuckle 28, and hence regulates the angle of swing of the gripping device 16 when the mast 4 is forwardly tilted.

As shown in Figs. 3 and 8 rocker arms 15 are mounted upon a shaft 39 which is supported in bearings 41 on the forks 14. Desirably the bearings 41 are rendered adjustable longitudinally on the forks 14 by providing a series of holes 42 in the forks for receiving the bolts which secure the bearings. Similarly, in order to make it possible to vary the horizontal distance between the forks the collars 43 on the ends of shaft 39 may be secured in various positions by means of screws 44. Additional collars 45 are fixed on shaft 39 to prevent separation of the rocker arms 15, and a buffer 46 is interposed between rocker arms 15, this buffer engaging the base of the drum, or whatever object is being handled, when the object is in the position represented in Figs. 5 and 6.

Each fork 14 is pivotally connected to a pin 47 near the bottom of the movable carriage 11 and is formed with an offset portion 48 having a rear surface 49 which is adapted to abut against a plate 51 on carriage 11 to limit relative angular movement between the fork and the carriage. It may be observed that the position of the outer ends of the forks 14 is substantially unaffected by forward or rearward tilting of the mast, see Figs. 1, 2 and 4, but when the carriage 11 is elevated, see Fig. 6, the forks 14 are at the maximum angle with the carriage and further downward swinging is prevented by the engagement of surface 49 with plate 51.

Each fork 14 is pivotally mounted upon a hanger member 52 which has hooks 53, 54 at the rear which engage transverse plates 51 and 55 of the carriage 11. As best shown in Fig. 7 the hanger members 52 are secured by bolts to plate 55 which has therein a series of bolt holes 56 permitting the hanger and members and forks to be spaced apart at the desired distance.

As shown in Fig. 3, each fork has an arcuately shaped forward edge 57 and to the rear thereof is provided with inwardly facing V-notches forming surfaces 58 and 59 which are adapted to abut against the bottom edge of a drum when it is inclined from its normal vertical position. The surfaces 58 and 59, as well as the buffer 46, form abutments which help to steady the base of the drum as it is inclined and while it is being carried upon the forks 14, all as more particularly set forth hereinafter in connection with the description of the operation of the truck attachment.

In Figs. 13 and 14 there is shown a modified form of fork 14a adapted for the handling of bales or the like. This form 14a has a spade-like end portion 61 and to the rear thereof has an upstanding abutment 62 for engaging the base of the load. In all other respects the forks 14a are similar to the forks 14 previously described. Fig. 13 shows the mast 4 in its forwardly tilted position with the forks 14a sliding between a bale C and the floor upon which it rests. Fig. 14 shows the mast in the vertical position and the base of the bale C engaging the abutment 62 preparatory to the operation of lifting the bale.

In Figs. 15 and 16 there is shown a further modification. The forks 14b are formed with cam surfaces 63 which engage similarly formed surfaces 64 at the base of hanger members 52b. Relative swinging between the works 14b and carriage 11b is limited by mutually engaging abutments 65.

In all forms of the invention the hanger members 52, 52b and the yoke member 29 are attached to the carriage 11 in such manner that they are readily removable. Hence it is a simple matter to apply or remove the complete attachment of this invention to or from a truck, whenever it is desired to convert a truck from one use to another.

The operation of the apparatus of this invention is as follows. Upon the assumption that it is desired to employ the truck for the handling of a drum, such as represented at B in the drawings, the various parts of the apparatus are first adjusted to suit the particular size of the drum to be handled. In this connection it may be noted that the apparatus is capable of handling objects of numerous sizes and shapes. The truck A is driven to a position adjacent to the drum B, such as represented in Fig. 1, the mast 4 being forwardly tilted so that the gripping device 16 is swung upwardly, and the ends of the forks 14 being brought to a position close to the base of the drum B. Thereupon the mast 4 is swung to the vertical position, as represented in Fig. 2. The resulting movement of the links 31 and the additional links consisting of rod 25 and turnbuckle 28 causes the rocker arms 15 and the gripping device 16 to assume the positions there shown. The drum B is firmly engaged at the top thereof and is ready to be inclined rearwardly.

Next, the operator tilts the mast 4 rearwardly, causing the drum B to be inclined as represented in Fig. 4. It will be observed that the drum may be so approached by the truck and gripped by the apparatus of this invention that it may be readily separated from a group of similar drums even though nested closely together. After the drum B has been thus inclined the truck A is advanced to the position represented in Fig. 5. Incident to this advancement the forward ends of the forks 14 slide under the raised bottom edges of the drum and cause such edges to be brought to a position where they may be subsequently engaged by the surfaces 58 and 59 of the V-shaped notches in the forks when the drum is elevated from the floor. Also the base of the drum is brought into engagement with the buffer 46. In this manner the base of the drum is steadied and restrained against sliding forwardly or rearwardly on the forks.

The operator then by means of the cylinder 6 and ram 7 raises the movable carriage 11 with the load thereon, to a position such as represented in Fig. 6, or to a higher elevation if desired. The drum may then be transported to its destination, firmly held at top and bottom by the load carrying attachment. The operations involved in discharging the drum are substantially the reverse of the operations which have been described, the drum being brought to the floor by lowering the carriage and being uprighted and released by swinging the mast to its forwardly tilted position.

The operations involved in handling bales, using the modified forks 14a shown in Figs. 13 and 14 are substantially the same. The truck A is advanced with the mast tilted forwardly to a point where leading ends of the forks 14a slide beneath the bale, see Fig. 13. The mast is therein swung to the vertical position and the truck further advanced to bring the bale into contact with the abutment 62, the forks 14a being then in the position shown in Fig. 14. Whenever it is found desirable to incline the load preparatory to lifting it this may be accomplished by rearward tilting of the mast.

Although I have described in considerable detail one example of my invention, together with certain modifications of parts thereof, showing the application of the load carrying attachment to one particular form of truck and for the handling of a load of a specific character, it will be apparent that the apparatus is capable of a wide variety of applications and uses, and that certain features thereof may be used to advantage without the use of other features, all without departing from the spirit of the claims which follow hereinafter. It is to be understood that the specific mechanisms referred to and claimed herein are intended to comprehend all mechanical equivalents and reversals of parts which function in a similar manner to accomplish the same result.

Having thus described my invention, I claim:

1. In a lift truck, a tiltable mast, a load carrying member movable up and down on said mast, a device for gripping the load at the top thereof, and mechanism connecting said device with the mast and supporting it forwardly of the mast in spaced relation thereto, including means whereby the rearward tilting of the mast retracts said gripping device to incline the load at an angle and bring the top thereof closer to the mast, and means whereby the forward tilting of the mast returns the load to its original upright position and incidentally releases said gripping device from its engagement with the load.

2. In a lift truck, a tiltable mast, a load carrying member movable up and down on said mast, a device for gripping the load at the top thereof and mechanism connecting said device with the mast and supporting it forwardly of the mast in spaced relation thereto, including a linkage serving to retract the gripping device upon the rearward tilting of the mast and thereby incline the load at an angle to its normal upright position and bring the top thereof closer to the mast, and an additional linkage serving to swing said gripping device upwardly upon the forward tilting of the mast and thereby release the gripping device from its engagement with the load.

3. In a lift truck, a truck body, a tiltable mast thereon, load carrying members movable up and down on said mast, a device for gripping the load at the top thereof, and mechanism connecting said device with the mast whereby the rearward tilting of the mast retracts said gripping device in relation to said truck body and to said mast to incline the load at an angle to its normal upright position, said load carrying members having means for steadying the load at its base incident to the inclining thereof, and said inclining mechanism being such as to magnify the movement of the mast so as to produce a greater inclination of the load than the angle of tilt of the mast.

4. In a lift truck, a truck body, a tiltable mast thereon, load carrying members movable up and down on said mast, a device for gripping the load at the top thereof, and mechanism connecting said device with the mast including means whereby the rearward tilting of the mast retracts said gripping device in relation to said truck body and to the mast to incline the load at an angle to its normal upright position, and means whereby the forward tilting of the mast causes an upward angular movement of the gripping device to release it from engagement with the load, said means for inclining the load and for releasing the gripping device being such as to magnify the movement of the mast so as to produce a greater inclination of the load than the rearward tilt of the mast, and a greater angular movement of the gripping device than the forward tilt of the mast.

5. In a lift truck, a truck body, a tiltable mast thereon, a pair of load carrying forks movable up and down on said mast, a device for gripping the load at the top thereof, and mechanism connecting said device with the mast and operable to cause the rearward tilting of the mast to retract said gripping device in relation to said truck body and to the mast and thereby incline the load at an angle to its normal upright position, said forks having inwardly facing notches for receiving the bottom edge of the load and steadying the same incident to the inclining thereof.

6. In a fork truck, a truck body, a tiltable mast thereon, a carriage movable up and down on said mast, a pair of forks projecting forwardly from said carriage and supported thereby, a device for gripping the top of a cylindrical object, and mechanism connecting said device with the mast and operable to cause the rearward tilting of the mast to retract said gripping device in relation to said truck body and thereby incline the object at an angle to its normal upright position, said forks having arcuate formations at their ends for initial abutment against the base of said object and having inwardly facing notches for subsequent engagement with the bottom of the object when inclined by said mechanism.

7. In a fork truck, a truck body, a tiltable mast thereon, a carriage movable up and down on said mast, a pair of forks projecting forwardly from said carriage and supported thereby, a device for gripping the top of a cylindrical object, and mechanism connecting said device with the mast and operable to cause the rearward tilting of the mast to retract said gripping device in relation to said truck body and thereby incline the object at an angle to its normal upright position, said forks having arcuate formations at their ends for initial abutment against the base of said object and having inwardly facing notches for subsequent engagement with the bottom of the object when inclined by said mechanism and said forks being mounted on said carriage with capacity for adjustment towards and away from each other to accommodate objects of different sizes.

8. In a fork truck, a truck body, a tiltable mast thereon, load carrying forks movable up and down on said mast, a device for gripping the load at the top thereof, and mechanism connecting said device with the mast and operable to cause the rearward tilting of the mast to retract said gripping device and thereby incline the load at an angle to its normal upright position and bring the top thereof closer to the mast, said forks being pivotally connected to said mast with capacity for swinging upwardly towards the mast, and said pivotal connection including means for limiting downward swinging of the forks with relation to the mast.

9. In a lift truck, a truck body, a tiltable mast thereon, a carriage movable up and down on said mast, load carrying forks pivotally mounted on said carriage, a device for gripping the load at the top thereof, mechanism connecting said device with the mast and operable to cause the rearward tilting of the mast to retract said gripping device and thereby incline the load at an angle to its normal upright position and bring the top thereof closer to the mast without substantially altering the position of said forks, and means for limiting downward swinging of the forks with relation to the mast.

10. An attachment for a lift truck consisting of a carriage adapted to be mounted on the mast of the truck for vertical and tilting movement, load carrying forks pivotally mounted on said carriage with capacity for limited swinging movement thereon, a device supported forwardly of the carriage above said forks for gripping the load at the top thereof, and mechanism for inclining the load in response to tilting of the carriage consisting of a motion magnifying linkage connecting said gripping device and said carriage and serving to incline the load at a greater angle than the angle of tilt of the carriage, said forks having upstanding abutments for engaging the load to steady the same at the base thereof incident to inclining the load.

11. An attachment for a lift truck consisting of a carriage adapted to be mounted on the mast of a truck for vertical and tilting movement, a load carrying member projecting forwardly from said carriage, a device for gripping the load at the top thereof including a support and a swinging arm adapted to engage the load near the top thereof, mechanism for inclining the load in response to forward tilting of the carriage consisting of a motion magnifying linkage connecting the support for the gripping device with said carriage and serving to incline the load at a greater angle than the angle of tilt of the carriage, and mechanism for releasing the load in response to rearward tilting of the carriage consisting of means connecting the swinging arm with said carriage.

12. An attachment for a lift truck consisting of a carriage adapted to be mounted on the mast of a truck for vertical and tilting movement, a load carrying member projecting forwardly from said carriage, a device for gripping the load at the top thereof including a support and a swinging arm adapted to span the load and engage the far edge thereof, mechanism for inclining the load consisting of means connecting the support for the gripping device with said carriage, and mechanism for releasing the load consisting of means connecting the swinging arm with said carriage, and means for varying the effective length of said swinging arm to adapt the same for handling objects of varying sizes.

13. An attachment for a lift truck consisting of a carriage adapted to be mounted on the mast of a truck for vertical and tilting movement, load carrying forks projecting forwardly from said carriage, a device for gripping the load at the top thereof including a swinging arm adapted to span the load and engage the far edge thereof, mechanism connected to said swinging arm and to said carriage whereby the tilt of the carriage retracts said swinging arm to incline the load at an angle to its normal upright position, means for varying the effective length of said swinging arm, and means for adjusting the distance between said forks, whereby said swinging arm and said forks may be adapted to handle objects of varying sizes.

14. In a lift truck, a truck body, a tiltable mast thereon, a carriage movable up and down on said mast, load carrying forks pivotally mounted on said carriage and extending forwardly therefrom with capacity for limited swinging movement, a device for gripping the load at the top thereof, and mechanism connecting said device with the carriage and supporting it forwardly of the mast above said forks, said mechanism including a motion magnifying linkage whereby the rearward tilting of the mast retracts said gripping device to incline the load at an angle greater than the angle of tilt of the mast and to bring the top of the load closer to the mast.

15. In a lift truck, a truck body, a tiltable mast thereon, a carriage movable up and down on said mast and having forks pivoted thereon and extending forwardly to engage the base of a load, a rocker support disposed forwardly of the carriage above said forks, a gripping device pivotally connected to said rocker support for engaging the load near the top thereof, and a motion magnifying linkage connecting said rocker support and said mast whereby the rearward tilting of the mast retracts said gripping device to incline the load at an angle greater than the angle of tilt of the mast and bring the top of the load closer to the mast.

16. In a lift truck, a truck body, a tiltable mast thereon, a carriage movable up and down on said mast including forks extending forwardly to engage the base of a load and a support disposed forwardly of the carriage above said forks, a gripping device connected to said support for engaging the load near the top thereof, and a motion magnifying-linkage connecting said support and mast whereby the rearward tilting of the mast retracts said gripping device to incline the load at an angle greater than the angle of tilt of the mast and bring the top of the load closer to the mast, said forks having means spaced forwardly of the carriage for abutting against the base of the load to steady it as the top is brought closer to the mast.

BENJAMIN A. DICKSON.

REFERENCES CITED

The following references are of record in the file of this patent:

UNITED STATES PATENTS

| Number | Name | Date |
|---|---|---|
| 781,003 | Holmes | Jan. 31, 1905 |
| 1,431,861 | Adams | Oct. 10, 1922 |
| 1,827,209 | Robbins | Oct. 13, 1931 |
| 2,288,447 | Goldberg | June 30, 1942 |
| 2,340,812 | Koob | Feb. 1, 1944 |
| 2,447,300 | Williams | Aug. 17, 1948 |
| 2,473,410 | Bevevino | June 14, 1949 |